(12) United States Patent
Ehmann et al.

(10) Patent No.: US 10,785,499 B2
(45) Date of Patent: Sep. 22, 2020

(54) METHOD AND APPARATUS FOR PROCESSING VIDEO SIGNAL ON BASIS OF COMBINATION OF PIXEL RECURSIVE CODING AND TRANSFORM CODING

(71) Applicant: LG ELECTRONICS INC., Seoul (KR)

(72) Inventors: Jana Ehmann, San Jose, CA (US); Onur G. Guleryuz, San Jose, CA (US); Sehoon Yea, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 16/074,710

(22) PCT Filed: Feb. 2, 2017

(86) PCT No.: PCT/KR2017/001117
§ 371 (c)(1),
(2) Date: Aug. 1, 2018

(87) PCT Pub. No.: WO2017/135692
PCT Pub. Date: Aug. 10, 2017

(65) Prior Publication Data
US 2019/0037232 A1 Jan. 31, 2019

Related U.S. Application Data
(60) Provisional application No. 62/289,930, filed on Feb. 2, 2016.

(51) Int. Cl.
*H04N 19/52* (2014.01)
*H04N 19/176* (2014.01)
(Continued)

(52) U.S. Cl.
CPC ........... *H04N 19/52* (2014.11); *H04N 19/105* (2014.11); *H04N 19/117* (2014.11);
(Continued)

(58) Field of Classification Search
None
See application file for complete search history.

(56) References Cited

U.S. PATENT DOCUMENTS

2006/0050972 A1* 3/2006 Reznic ................. H04N 19/593
382/232
2013/0016774 A1* 1/2013 Oh ....................... H04N 19/157
375/240.03

FOREIGN PATENT DOCUMENTS

KR 10-2015-0052259 A 5/2005
KR 10-0541953 B1 1/2006
(Continued)

OTHER PUBLICATIONS

Hong et al., "Cross residual transform for lossless intra-coding for HEVC," Signal Processing: Image Communication 28, 1335-1341, 2013.*
(Continued)

*Primary Examiner* — Michael J Hess
(74) *Attorney, Agent, or Firm* — Dentons US LLP

(57) ABSTRACT

The present invention provides a method for encoding a video signal by using an enhanced prediction signal, the method comprising the steps of: generating a prediction signal for a current block, wherein the prediction signal is generated by applying a prediction weight to a reconstructed pixel of the current block and a pixel of a motion-compensated previously decoded block; obtaining an optimal quantized transform coefficient for the current block through rate-distortion optimization, on the basis of the prediction
(Continued)

signal; and performing entropy encoding of the optimal quantized transform coefficient.

13 Claims, 15 Drawing Sheets

(51) Int. Cl.
    *H04N 19/13*     (2014.01)
    *H04N 19/124*     (2014.01)
    *H04N 19/567*     (2014.01)
    *H04N 19/105*     (2014.01)
    *H04N 19/46*     (2014.01)
    *H04N 19/51*     (2014.01)
    *H04N 19/182*     (2014.01)
    *H04N 19/117*     (2014.01)
    *H04N 19/126*     (2014.01)
    *H04N 19/147*     (2014.01)
    *H04N 19/192*     (2014.01)

(52) U.S. Cl.
    CPC ......... *H04N 19/124* (2014.11); *H04N 19/126* (2014.11); *H04N 19/13* (2014.11); *H04N 19/147* (2014.11); *H04N 19/176* (2014.11); *H04N 19/182* (2014.11); *H04N 19/192* (2014.11); *H04N 19/46* (2014.11); *H04N 19/51* (2014.11); *H04N 19/567* (2014.11)

(56) References Cited

FOREIGN PATENT DOCUMENTS

| KR | 10-0750136 B1 | 8/2007 |
|---|---|---|
| KR | 10-2012-0065953 A | 6/2012 |
| KR | 10-1541077 B1 | 7/2015 |

OTHER PUBLICATIONS

Farrelle, "Recursive Block Coding for Image Data Compression," 1990.*

* cited by examiner (a)

(b)

(a) Reference frame (b) Decoded frame (c) Transform Unit quadtree

▢ : no residual
▨ : Pixel recursive transform mode off
▧ : Pixel recursive transform mode on (a) Reference frame (b) Decoded frame (c) Transform Unit quadtree ▒ : no residual
▓ : Pixel recursive transform mode off
█ : Pixel recursive transform mode on (a) Reference frame (b) Decoded frame (c) Transform Unit quadtree ▨ : no residual
▨ : Pixel recursive transform mode off
▨ : Pixel recursive transform mode on

FIG. 15

| # | Sequence name | BD-rate savings(%) | Coverage(%) |
|---|---|---|---|
| 1 | BUS | 1.74 | 53.17 |
| 2 | Flower | 3.33 | 67.42 |
| 3 | Foreman | 1.03 | 31.96 |
| 4 | Container | 1.27 | 43.90 |
| 5 | Coastguard | 1.57 | 57.97 |
| 6 | Mobile | 2.87 | 66.38 |
| 7 | BasketballPass | 1.10 | 32.99 |
| 8 | BlowingBubbles | 1.83 | 41.44 |
| 9 | BQSquare | 1.86 | 53.88 |
|   | Total Average | 1.84 | 49.90 |

METHOD AND APPARATUS FOR PROCESSING VIDEO SIGNAL ON BASIS OF COMBINATION OF PIXEL RECURSIVE CODING AND TRANSFORM CODING

CROSS-REFERENCE TO RELATED APPLICATIONS

This application is the National Stage filing under 35 U.S.C. 371 of International Application No. PCT/KR2017/001117, filed on Feb. 2, 2017, which claims the benefit of U.S. Provisional Applications No. 62/289,930, filed on Feb. 2, 2016, the contents of which are all hereby incorporated by reference herein in their entirety.

TECHNICAL FIELD

The present invention relates to a method and apparatus for encoding/decoding a video signal and, more particularly, to a technology for processing a video signal based on the coupling of pixel recursive coding and transform coding.

BACKGROUND ART

Compression encoding means a series of signal processing technologies for transmitting digitized information through a communication line or storing the information in a form suitable for a storage medium. Media, such as a picture, an image and voice, may be the subject of compression encoding. In particular, a technology performing compression encoding on an image is called video image compression.

Many media compression technologies are based on two approach methods called prediction coding and transform coding. In particular, a hybrid coding technology adopts a method of coupling the advantages of the two methods for video coding, but each of the coding technologies has the following disadvantages.

In the case of prediction coding, any statistical dependency cannot be used in obtaining a prediction error sample. That is, prediction coding is based on that a signal element using the already coded part of the same signal is predicted and a difference value between a predicted value and an actual value is coded. This complies with an information theory that a more precisely predicted signal can be compressed more efficiently and a better compression effect can be obtained by increasing consistency and accuracy of prediction.

Meanwhile, in the case of transform coding, in general, orthogonal transform, such as discrete cosine transform (hereinafter referred to as "DCT"), may be used. Such transform coding is a technology for decomposing a signal into a series of elements in order to identify the most important data. Most of transform coefficients become 0 through quantization.

However, transform coding has a disadvantage in that it must depend on the first available data only in acquiring the prediction value of a sample. For this reason, it is difficult for a prediction signal to have high quality.

Accordingly, the present invention is to provide a new coding method of integrating prediction coding and transform coding using previously decoded pixels.

DISCLOSURE

Technical Problem

The present invention is to provide a method and apparatus for encoding/decoding a video signal using an enhanced prediction signal.

Furthermore, the present invention is to propose an algorithm for processing a video signal based on the coupling of pixel recursive coding and transform coding.

Furthermore, the present invention is to provide a method for an encoder to obtain an optimal quantized transform coefficient.

Furthermore, the present invention is to provide an inter-prediction tool or hybrid inter/intra-prediction tool which performs optimal prediction based a spatio-temporal video characteristic.

Technical Solution

The present invention provides a method and apparatus for encoding/decoding a video signal using an enhanced prediction signal.

Furthermore, the present invention provides an algorithm for processing a video signal based on the coupling of pixel recursive coding and transform coding.

Furthermore, the present invention provides a method of generating a more accurate prediction signal by applying a prediction weight to a reconstructed pixel of a current block and a pixel of a motion-compensated previously decoded block.

Furthermore, the present invention provides a method for an encoder to obtain an optimal quantized transform coefficient by rate-distortion optimization.

Furthermore, the present invention provides a method of generating a more accurate prediction signal by determining a prediction weight based on a block type.

Furthermore, the present invention provides a method of defining a pixel recursive transform flag indicating whether a pixel recursive decoding is performed.

Advantageous Effects

The present invention can perform more precise prediction and reduce error propagation by proposing an algorithm for processing a video signal based on the coupling of pixel recursive coding and transform coding.

Furthermore, the present invention can perform inverse transform using the existing transform method without increasing the complexity of a decoder by obtaining an optimal quantized transform coefficient by rate-distortion optimization in an encoder.

DESCRIPTION OF DRAWINGS

FIG. 15 is a table showing high efficiency video coding (HEVC) versus a percentage of Bjontegaard Delta (BD)-rate savings for nine test sequences as an embodiment to which the present invention is applied.

BEST MODE

Figure 1:
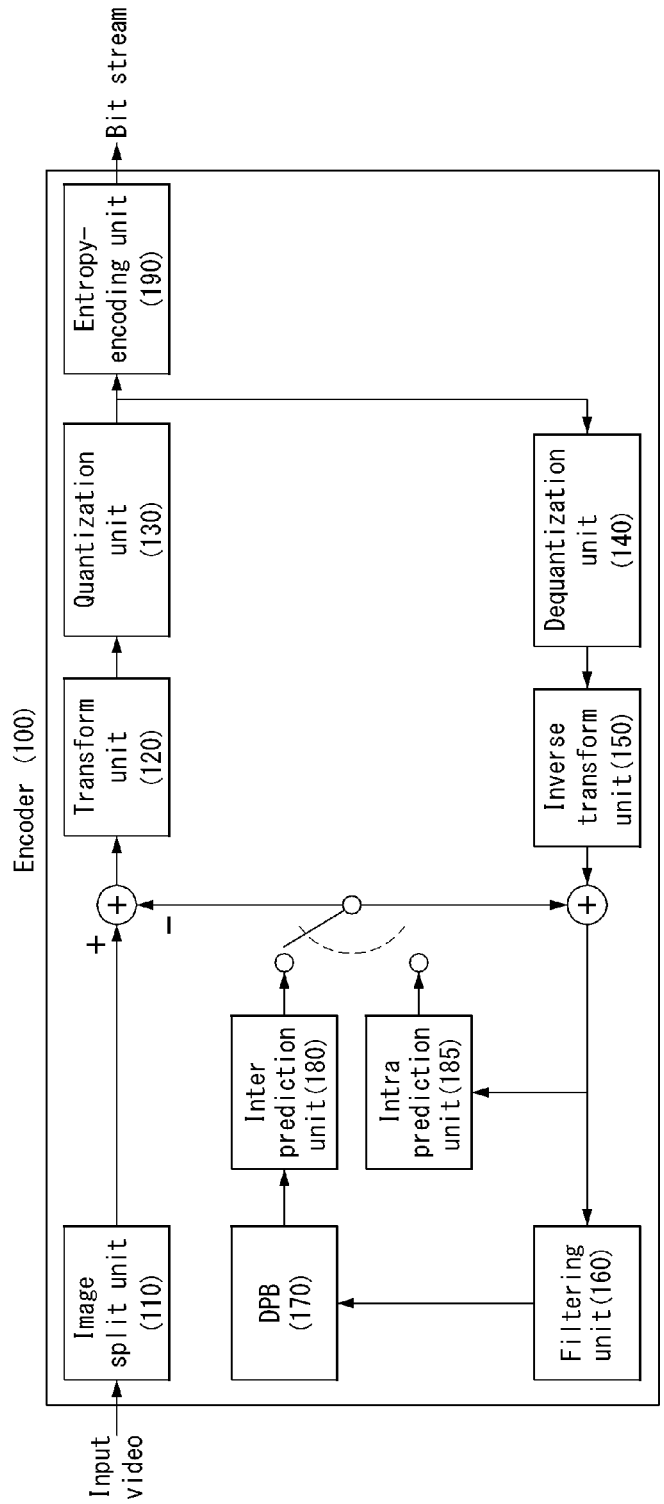
FIG. 1 shows a schematic block diagram of an encoder for encoding a video signal according to one embodiment of the present invention.

The present invention provides a method for encoding a video signal using an enhanced prediction signal, including generating a prediction signal for a current block, wherein the prediction signal is generated by applying a prediction weight to a reconstructed pixel of the current block and a pixel of a motion-compensated previously decoded block; obtaining an optimal quantized transform coefficient for the current block by rate-distortion optimization based on the prediction signal; and entropy-encoding the optimal quantized transform coefficient.

Furthermore, in the present invention, the prediction weight is generated based on a predetermined block type.

Furthermore, in the present invention, the predetermined block type is divided into a plurality of categories, and the plurality of categories includes at least one of a horizontal type, a vertical type, a diagonal type, a non-diagonal type or a smooth type.

Furthermore, in the present invention, the plurality of categories is classified based on a score obtained by filtering the motion-compensated previously decoded block.

Furthermore, in the present invention, a 5-tap flattening filter is used to determine a score of the smooth type, and a 3-tap directional filter is used to determine a score of remaining types.

Furthermore, in the present invention, the method further includes transmitting a pixel recursive transform flag indicating whether the optimal quantized transform coefficient is obtained by the rate-distortion optimization based on the prediction signal.

Furthermore, the present invention provides a method for decoding a video signal using an enhanced prediction signal, including entropy-decoding the video signal; inverse-quantizing the entropy-decoded video signal to obtain a transform coefficient; reconstructing a residual signal by performing an inverse-transform on the transform coefficient; generating a prediction signal for a current block of the video signal; and reconstructing the video signal by adding the reconstructed residual signal to the prediction signal, wherein the prediction signal is generated by applying a prediction weight to a reconstructed pixel of the current block and a pixel of a motion-compensated previously decoded block.

Furthermore, in the present invention, the method further includes transmitting a pixel recursive transform flag indicating whether the optimal quantized transform coefficient is obtained by the rate-distortion optimization based on the prediction signal.

Furthermore, the present invention provides an apparatus for encoding a video signal using an enhanced prediction signal, including a prediction unit generating a prediction signal for a current block; a transform unit obtaining an optimal quantized transform coefficient for the current block by rate-distortion optimization based on the prediction signal; and an entropy encoding unit entropy-encoding the optimal quantized transform coefficient, wherein the prediction signal is generated by applying a prediction weight to a reconstructed pixel of the current block and a pixel of a motion-compensated previously decoded block.

Furthermore, in the present invention, the transform unit transmits a pixel recursive transform flag indicating whether the optimal quantized transform coefficient is obtained by the rate-distortion optimization based on the prediction signal.

Furthermore, the present invention an apparatus for decoding a video signal using an enhanced prediction signal, including an entropy encoding unit entropy-decoding the video signal; a dequantization unit obtaining a transform coefficient by inverse-quantizing the entropy-decoded video signal; a transform unit reconstructing a residual signal by performing an inverse transform on the transform coefficient; a prediction unit generating a prediction signal for a current block of the video signal; and a reconstruction unit reconstructing the video signal by adding the reconstructed residual signal to the prediction signal, wherein the prediction signal is generated by applying a prediction weight to a reconstructed pixel of the current block and a pixel of a motion-compensated previously decoded block.

MODE FOR INVENTION

Hereinafter, exemplary elements and operations in accordance with embodiments of the present invention are described with reference to the accompanying drawings, however, it is to be noted that the elements and operations of the present invention described with reference to the drawings are provided as only embodiments and the technical ideas and core elements and operation of the present invention are not limited thereto.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly substituted and interpreted in each coding process.

Further, partitioning, decomposition, splitting, and split, etc. may also be appropriately substituted and interpreted for each coding process.

FIG. 1 shows a schematic block diagram of an encoder for encoding a video signal, according to one embodiment of the present invention.

Referring to FIG. 1, the encoder 100 may include an image split unit 110, a transform unit 120, a quantization unit 130, a dequantization unit 140, an inverse transform unit 150, a filtering unit 160, a decoded picture buffer (DPB) 170, an inter prediction unit 180, an intra-prediction unit 185, and an entropy encoding unit 190.

The image split unit 110 may divide an input image (or a picture or a frame) input to the encoder 100 into one or more process units. For example, the process unit may be a coding tree unit (CTU), a coding unit (CU), a prediction unit (PU) or a transform unit (TU).

However, the terms are used only for convenience of illustration of the present invention. The present invention is not limited to the definitions of the terms. In this specification, for convenience of illustration, the term "coding unit" is used as a unit used in a process of encoding or decoding a video signal, but the present invention is not limited thereto. Another process unit may be appropriately selected based on the contents of the present invention.

The encoder 100 may generate a residual signal by subtracting a prediction signal output by the inter prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square or to a block of a variable size other than a square.

The quantization unit 130 may quantize the transform coefficient and transmits the quantized coefficient to the entropy encoding unit 190. The entropy encoding unit 190 may entropy-code the quantized signal and then output the entropy-coded signal as bit streams.

The quantized signal output by the quantization unit 130 may be used to generate a prediction signal. For example, the quantized signal may be subjected to a dequantization and an inverse transform via the dequantization unit 140 and the inverse transform unit 150 in the loop respectively to reconstruct a residual signal. The reconstructed residual signal may be added to the prediction signal output by the inter prediction unit 180 or intra prediction unit 185 to generate a reconstructed signal.

Meanwhile, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter prediction unit 180.

The inter prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and dequantization on a block basis in the previous encoding/decoding. Thus, this may result in blocking artifacts or ringing artifacts.

Accordingly, in order to solve the performance degradation due to the discontinuity or quantization of the signal, the inter prediction unit 180 may interpolate signals between pixels on a subpixel basis using a low-pass filter. In this case, the subpixel may mean a virtual pixel generated by applying an interpolation filter. An integer pixel means an actual pixel within the reconstructed picture. The interpolation method may include linear interpolation, bi-linear interpolation and Wiener filter, etc.

The interpolation filter may be applied to the reconstructed picture to improve the accuracy of the prediction. For example, the inter prediction unit 180 may apply the interpolation filter to integer pixels to generate interpolated pixels. The inter prediction unit 180 may perform prediction using an interpolated block composed of the interpolated pixels as a prediction block.

Meanwhile, the intra prediction unit 185 may predict a current block by referring to samples in the vicinity of a block to be encoded currently. The intra prediction unit 185 may perform a following procedure to perform intra-prediction. First, the intra prediction unit 185 may prepare reference samples needed to generate a prediction signal. Thereafter, the intra prediction unit 185 may generate the prediction signal using the prepared reference samples. Thereafter, the intra prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction.

The prediction signal generated via the inter prediction unit 180 or the intra prediction unit 185 may be used to generate the reconstructed signal or used to generate the residual signal.

Figure 2:
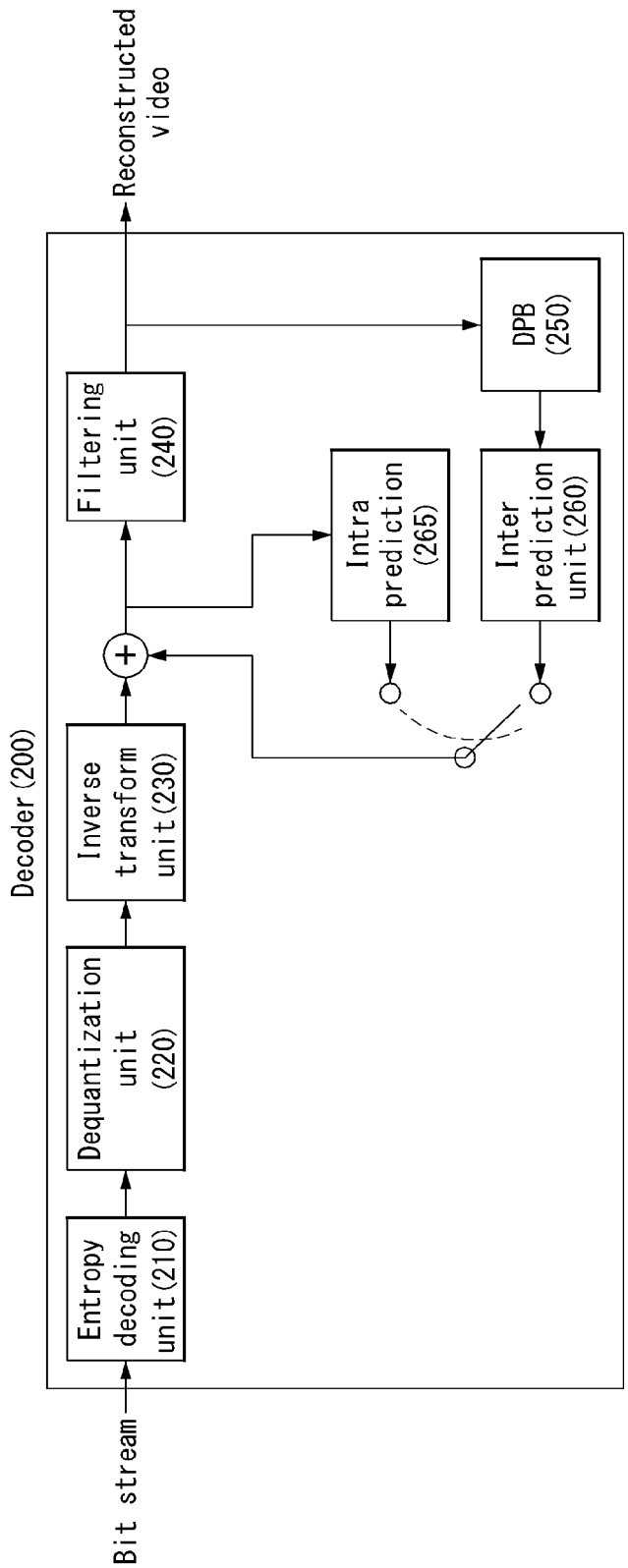
FIG. 2 shows a schematic block diagram of a decoder for decoding a video signal according to one embodiment of the present invention.

FIG. 2 shows a schematic block diagram of a decoder for decoding a video signal according to one embodiment of the present invention.

Referring to FIG. 2, the decoder 200 may include a parsing unit (not shown), an entropy decoding unit 210, a dequantization unit 220, an inverse transform unit 230, a filtering unit 240, a decoded picture buffer (DPB) 250, an inter prediction unit 260, an intra-prediction unit 265 and a reconstruction unit (not shown).

A reconstructed video signal output by the decoder 200 may be reproduced using a reproducing device.

The decoder 200 may receive the signal output by the encoder as shown in FIG. 1. The received signal may be entropy-decoded via the entropy decoding unit 210.

The dequantization unit 220 obtains a transform coefficient from an entropy-decoded signal using quantization step size information.

The inverse transform unit 230 obtains a residual signal by inverse-transforming a transform coefficient.

A reconstructed signal may be generated by adding the obtained residual signal to the prediction signal output by the inter prediction unit 260 or the intra prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter prediction unit 260.

Herein, detailed descriptions for the filtering unit 160, the inter prediction unit 180 and the intra prediction unit 185 of the encoder 100 may be equally applied to the filtering unit 240, the inter prediction unit 260 and the intra prediction unit 265 of the decoder 200, respectively.

Meanwhile, hybrid coding may be applied to the encoder 100 of FIG. 1 and the decoder 200 of FIG. 2. In this case, the hybrid coding may mean that the advantages of the prediction coding and the transform coding have been combined. In this case, the internal structure of the encoder 100 of FIG. 1 and the decoder 200 of FIG. 2 may be more simplified and expressed. This is described more specifically with reference to FIGS. 5 and 6.

Figure 3:
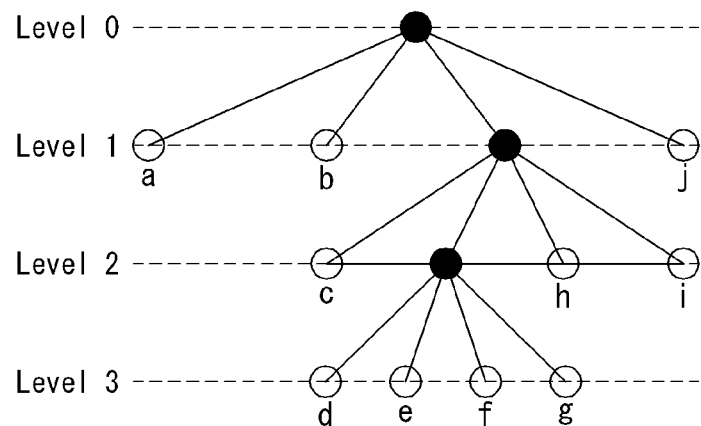
FIG. 3 is a diagram for illustrating a split structure of a coding unit according to one embodiment of the present invention.
Figure 3:
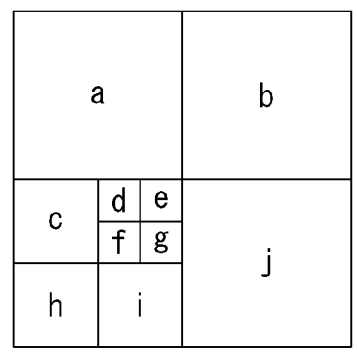

FIG. 3 is a diagram for illustrating a split structure of a coding unit, according to one embodiment of the present invention.

The encoder may split or divide one image or picture into a rectangular coding tree unit (CTU). Thereafter, the encoder may sequentially encode CTUs one by one according to the raster scan order.

For example, the size of a CTU may be set to 64×64, 32×32 or 16×16, but the present invention is not limited thereto. The encoder may select the size of a CTU based on resolution of an input image or the characteristics of an input image. A CTU may include a coding tree block (CTB) for a luma component and a coding tree block (CTB) for corresponding two chroma components.

A single CTU may be decomposed into a quad-tree (hereinafter referred to as a "QT") structure. For example, one CTU may be divided into four units, each unit having a square shape, with a length of each side thereof decreasing by one half. This decomposition or division of the QT structure may be performed recursively.

Referring to FIG. 3, a root node of the QT may be related to the CTU. The QT may be partitioned until a leaf node is reached. In this case, the leaf node may be referred to as a coding unit (CU).

The CU may refer to a base unit for the coding process of an input image, for example, a base unit for intra/inter-predictions. The CU may include a CB for a luma component and a CB for two chroma components corresponding to the luma component. For example, the size of the CU may be set to 64×64, 32×32, 16×16 or 8×8. However, the present invention is not limited thereto. In the case of a high-resolution image, the size of the CU may be increased or varied.

Referring to FIG. 3, the CTU may correspond to the root node, and may have the smallest depth (i.e., level 0). Depending on the characteristics of the input image, the CTU may not be divided. In this case, the CTU corresponds to the CU.

The CTU may be decomposed into a QT form. As a result, sub-nodes having a depth of level 1, may be generated. Among the sub-nodes having a depth of level 1, a sub-node (i.e., a leaf node) that is not further divided corresponds to a CU. For example, in FIG. 3(b), the coding units CU(a), CU(b), and CU(j) corresponding to nodes a, b and j, respectively, is split in a CTU once, thus having a depth of level 1.

At least one of sub-nodes having a depth of level 1 may be further split into a QT form. Among the sub-nodes having a depth of level 2, a sub-node (i.e., a leaf node) that is not further divided corresponds to a CU. For example, in FIG. 3(b), the coding units CU(c), CU(h), and CU(i) corresponding to nodes c, h and i respectively are partitioned two times in the CTU and thus has a depth of level 2.

Further, among the sub-nodes having a depth of level 2, at least one sub-node may be further split into a QT form. Among the sub-nodes having a depth of level 3, a sub-node (i.e., a leaf node) that is not further divided corresponds to a CU. For example, in FIG. 3(b), the coding units CU(d), CU(e), CU(f) and CU(g) corresponding to nodes d, e, f and g respectively are partitioned three times in the CTU and thus has a depth of level 3.

The encoder may determine a maximum or minimum size of the CU based on the characteristics (e.g., resolution) of the video image or the efficiency of coding. Information on the maximum or minimum size and/or information used for deriving the maximum or minimum size may be included in the bit stream. Hereinafter, a CU having a maximum size may be referred to as a LCU (Largest Coding Unit), while a CU having a minimum size may be referred to as a SCU (Smallest Coding Unit).

In addition, a CU having a tree structure may have a predetermined maximum depth information (or maximum level information) and may be hierarchically divided. Further, each divided CU may have depth information. The depth information indicates the number and/or degree of divisions of the CU. Thus, the depth information may include information about the size of the CU.

The LCU is divided into a QT form. Therefore, the size of the SCU may be obtained using the LCU size and the maximum depth information of the tree. Conversely, the size of the SCU and the maximum depth information of the tree may be used to determine the size of the LCU.

For a single CU, information indicating whether or not the CU is divided may be transmitted to the decoder. For example, the information may be defined as a split flag and may be represented by a syntax element "split_cu_flag." The split flag may be included in all CUs except a SCU. For example, when the value of the split flag is "1", the corresponding CU is further divided into four CUs. When the value of the split flag is "0", the corresponding CU is not further divided, and, then, the coding process for the corresponding CU may be performed.

In the embodiment shown in FIG. 3, although the QT structure described above is applied to the CU division by way of example, the QT structure described above may be equally applied to TU (transform unit) division, where the TU is a base unit for performing a transform.

The TU may be hierarchically partitioned from the CU to be coded into a QT structure. For example, the CU may correspond to a root node of the tree for the transform unit TU.

The TU is divided into a QT structure. Thus, each of TUs divided from the CU may be further divided into smaller sub-TUs. For example, the size of the TU may be set to 32×32, 16×16, 8×8 or 4×4. However, the present invention is not limited thereto. For high-resolution images, the size of a TU may be larger or may vary.

For a single TU, information indicating whether or not the TU is divided may be transmitted to the decoder. For example, the information may be defined as a split transform flag and may be represented by a syntax element "split_transform_flag".

The split transform flag may be included in all TUs except the smallest TU (STU). For example, when the value of the split transform flag is "1", the corresponding TU is further divided into four TUs. When the value of the split transform flag is "0", the corresponding TU is not further divided, and, then, the coding process for the corresponding TU may be performed.

As described above, a CU is a base unit for the coding process in which the intra-prediction or inter-prediction is performed. In order to more effectively code the input image, the CU may be divided into PUs (Prediction Units). A PU is a base unit forming a prediction block. It is possible to generate different prediction blocks on a PU basis even within a single CU. The PU may be divided differently depending on whether an intra-prediction mode or an inter-prediction mode is used as a coding mode for a CU to which the PU belongs.

Figure 4:
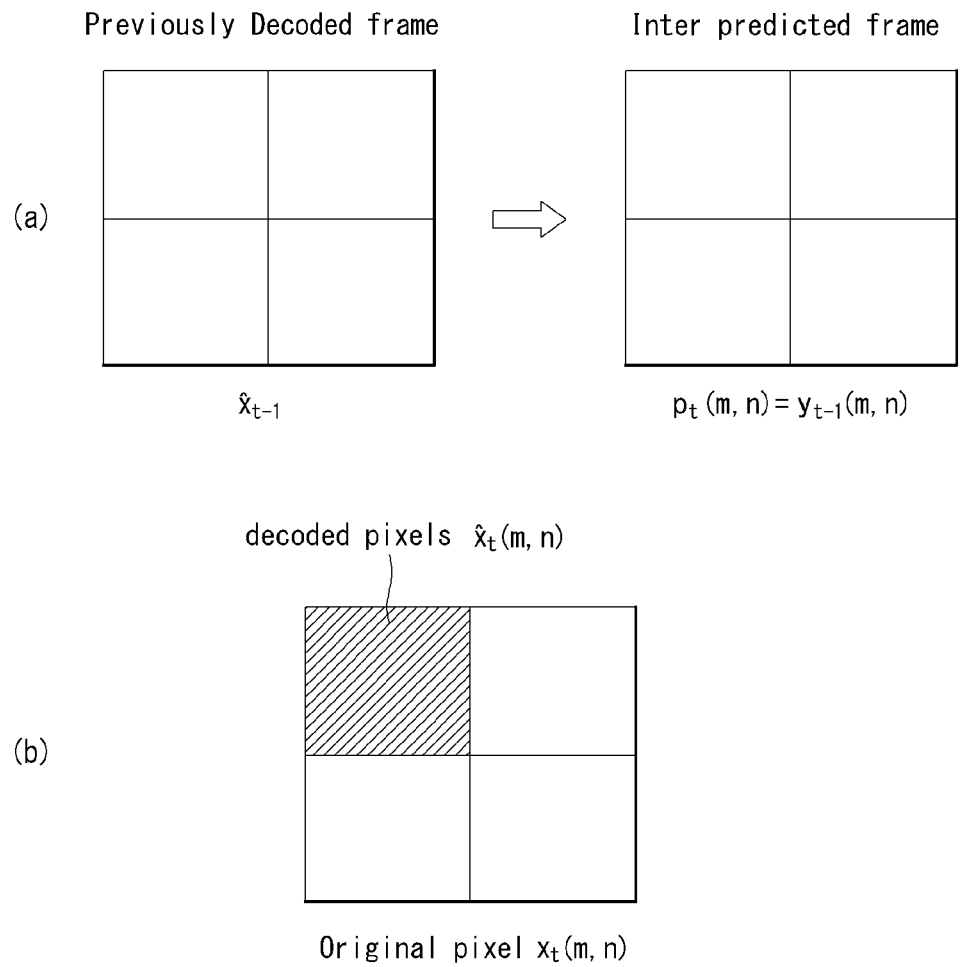
FIG. 4 shows a block diagram of a current frame and a previous frame for illustrating pixel recursive transform coding as an embodiment to which the present invention is applied.

FIG. 4 shows a block diagram of a current frame and a previous frame for illustrating pixel recursive transform coding as an embodiment to which the present invention is applied.

Prediction coding may be applied to individual samples each time. Practically, the most powerful method for prediction is to have a recursive structure. Such a recursive structure is based on the fact that prediction can be the best when the closest value is used. That is, the best prediction may be performed if a prediction value is directly used to predict other value after it is coded.

As described above, a method of performing spatio-temporal prediction for a pixel of a current block based on previously decoded data is called pixel recursive coding.

The present invention provides a method of combining a predictor based on pixel recursive coding with transform coding. In this specification, such a coding method is called pixel recursive transform coding.

Pixel Recursive Coding

In pixel recursive coding, a pixel value of a current block is predicted using a decoded pixel of the current block in addition to pixels of a motion-compensated previously decoded block. Furthermore, a prediction error (i.e., residual) is encoded and transmitted to the decoder.

The pixel recursive coding can provide an optimal prediction signal based on a spatio-temporal video characteristic.

First, referred to FIG. 4(b), $x_t(m,n)$ indicates the original pixel of a current frame or current block at a time t and a location (m,n), and $\hat{x}_t(m,n)$ indicates a decoded pixel corresponding to the original pixel.

Referring to FIG. 4(a), $\hat{x}_{t-1}$ indicates a previously decoded frame, and $y_{t-1}(m,n)$ indicates an inter-predicted frame used for the inter prediction of a current block. In this case, the inter-predicted frame may be called a reference frame or motion-compensated frame for the current block (or current frame). In this paragraph, a term "frame" is used, but may be properly interchangeably used with a term, such as a picture, frame, block, unit, data, sample or pixel, in each coding step.

Accordingly, prediction for the original pixel $x_t(m,n)$ of the current frame may be performed like Equation 1.

$$p_t(m,n)=y_{t-1}(m,n) \qquad \text{[Equation 1]}$$

That is, the previously decoded frame $\hat{x}_{t-1}$ may be used to generate the inter-predicted frame $y_{t-1}(m,n)$ for the original pixel $x_t(m,n)$ of the current frame. That is, if each block fetches a block indicated by a corresponding motion vector from $\hat{x}_{t-1}$, $y_{t-1}(m,n)$ can be configured.

According to Equation 1, a prediction error (i.e., residual) $r_t(m,n)$ may be calculated like Equation 2.

$$r_t(m,n)=x_t(m,n)-p_t(m,n) \qquad \text{[Equation 2]}$$

The encoder may obtain a transform coefficient $c_t(m,n)$ by performing a transform on the residual $r_t(m,n)$. The encoder quantizes the transform coefficient $c_t(m,n)$, and the quantized transform coefficient may be expressed as $\hat{c}_t(m,n)$. The quantized transform coefficient is entropy-encoded and transmitted to the decoder.

In an embodiment of the present invention, the pixel recursive coding can obtain a more elaborate prediction value by applying a prediction weight to a decoded pixel of a current block and a pixel of a motion-compensated previously decoded block. For example, the pixel recursive coding may be performed like Equation 3.

$$p_t(m,n) = \sum_{(i,j)\in \Gamma_{m,n}} \alpha_{i,j}\hat{x}_t(i,j) + \sum_{(k,l)\in \Omega_{m,n}} \beta_{k,l}y_{t-1}(k,l) \qquad \text{[Equation 3]}$$

In this case, $\Gamma_{m,n}$ is a spatially causal neighborhood of (m,n), and $\Omega_{m,n}$ indicates a potentially non-causal neighborhood of (m, n). Furthermore, $\alpha_{i,j}$ and $\beta_{k,l}$ indicate prediction weights.

The present invention provides a pixel recursive transform coding in which the pixel recursive coding and the transform coding are combined, and a more elaborate prediction value can be obtained through the pixel recursive transform coding.

The decoder to which the present invention is applied may reconstruct a residual by inverse-transforming the residual of the entire block and performing pixel recursive decoding. The reconstructed residual is added to a prediction signal, thereby being capable of reconstructing the original signal. This may be expressed like Equation 4.

$$\hat{x}_t(m,n)=r_t(m,n)+p_t(m,n) \qquad \text{[Equation 4]}$$

In this case, $\hat{x}_t(m,n)$ indicates a decoded pixel corresponding to the original pixel, $r_t(m,n)$ indicates a residual, and $p_t(m,n)$ indicates a prediction pixel. In this case, the $p_t(m,n)$ may be a value obtained by Equation 3.

Figure 5:
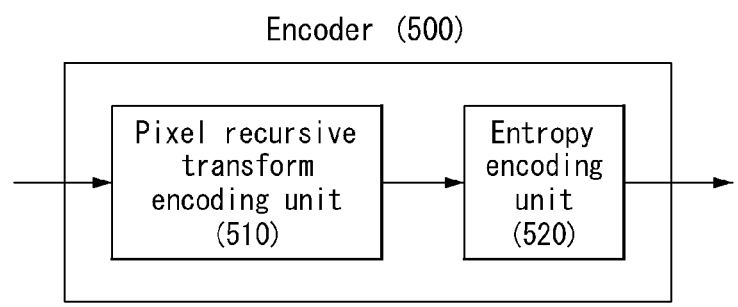
FIG. 5 shows a schematic block diagram of an encoder in which an algorithm of pixel recursive transform coding in which pixel recursive coding and transform coding are coupled is performed as an embodiment to which the present invention is applied.

FIG. 5 shows a schematic block diagram of an encoder in which an algorithm of pixel recursive transform coding in which pixel recursive coding and transform coding are coupled is performed as an embodiment to which the present invention is applied.

Referring to FIG. 5, the encoder 500 to which the present invention is applied may basically include a pixel recursive transform encoding unit 510 and an entropy encoding unit 520.

The pixel recursive transform encoding unit 510 may generate a prediction signal for a current block according to a pixel recursive transform coding algorithm, and may obtain an optimal quantized transform coefficient for the current block by rate-distortion optimization based on the prediction signal.

In this case, the prediction signal may be generated by applying a prediction weight to a reconstructed pixel of the current block and a pixel of a motion-compensated previously decoded block. For example, the prediction signal may mean that it has been generated by a pixel recursive transform coding method subsequently proposed in the present invention. As a detailed example, the prediction signal may mean Equation 5 to be described later.

In one embodiment, the prediction weight may be generated based on a predetermined block type. In this case, the predetermined block types are classified into a plurality of categories. The plurality of categories may include at least one of a horizontal type, a vertical type, a diagonal type, a non-diagonal type or a smooth type.

Furthermore, the plurality of categories may be classified based on a score obtained by filtering a motion-compensated previously decoded block. For example, a 5-tap flattening filter may be used to determine a score of the smooth type, and a 3-tap directional filter may be used to determine scores of the remaining types.

Meanwhile, if pixel recursive transform coding is performed as described above, the encoder may signal a pixel recursive transform flag. In this case, the pixel recursive transform flag may indicate whether an optimal quantized transform coefficient is obtained by rate-distortion optimization based on a prediction signal. In this case, the prediction signal may mean that it has been generated by the proposed pixel recursive transform coding method.

The entropy encoding unit 520 entropy-encodes the optimal quantized transform coefficient.

Figure 6:
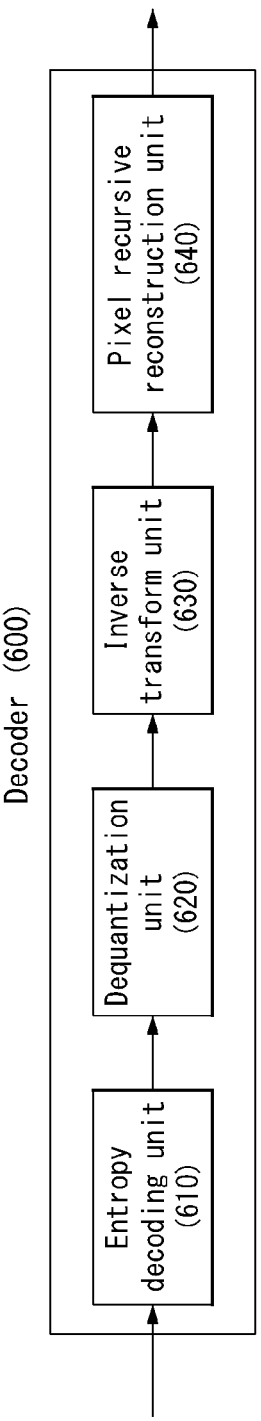
FIG. 6 shows a schematic block diagram of a decoder in which the algorithm of pixel recursive transform coding in which pixel recursive coding and transform coding are coupled is performed as an embodiment to which the present invention is applied.

FIG. 6 shows a schematic block diagram of a decoder in which the algorithm of pixel recursive transform coding in which pixel recursive coding and transform coding are coupled is performed as an embodiment to which the present invention is applied.

Pixel Recursive Transform Coding

In an embodiment of the present invention, transform of a block unit is used to encode a prediction error. Pixel recursive transform coding is performed on a block-by-block basis.

Referring to FIG. 6, a decoder 600 to which the present invention is applied includes at least one of an entropy decoding unit 610, a dequantization unit 620, an inverse transform unit 630 and a pixel recursive reconstruction unit 640.

The decoder 600 may receive a video signal from an encoder. The received video signal may be entropy-decoded through the entropy decoding unit 610. The entropy-decoded video signal may include an optimal quantized transform coefficient. The optimal quantized transform coefficient may have been generated by applying embodiments of the present invention are applied.

The dequantization unit 620 may obtain a transform coefficient by performing inverse transform on the optimal quantized transform coefficient using quantization step size information.

The inverse transform unit 630 may reconstruct a residual signal by inverse-transforming the transform coefficient. For example, the residual signal may mean $(I-A)^{-1}H\hat{c}$ of Equation 8 to be described later. The inverse transform may mean $T_{pr}=(I-A)^{-1}H$ of Equation 10 to be described later.

The pixel recursive reconstruction unit 640 may generate a prediction signal and reconstruct the video signal by adding the residual to the prediction signal. For example, the prediction signal may mean $(I-A)^{-1}By$ of Equation 8 to be described later.

First, it is assumed that pixels within a block are ordered into vectors through a specific sequence. In the specific sequence, assuming that an $(N^2 \times 1)$ vector including a pixel value of an $(N \times N)$ current block is x, $x(j)$ $(j=1, \ldots, i-1)$ should be set to have spatially causality with $x(i)$ $(1 \le i \le N^2)$. Likewise, the $(N^2 \times 1)$ vector when the same sequence is applied to pixels decoded from a current block may be said to be $\hat{x}$, and the $(N^2 \times 1)$ vector when the same sequence is applied to pixels of a motion-compensated previously decoded block may be said to be y.

If Equation 3 is rewritten from the viewpoint of a vector and matrix, it may be written like Equation 5.

$$p = A\hat{x} + By \quad \text{[Equation 5]}$$

In this case, matrices A and B include prediction weights $\alpha_{i,j}$ and $\beta_{k,l}$, respectively.

In one embodiment, the matrix A may be strictly lower triangular as if $\Gamma_{m,n}$ defined in Equation 3 has spatially causality. Accordingly, if a decoded residual is indicated as $\hat{r}$, a combination of Equations 5 and 2 may be written like Equation 6.

$$\hat{x} = A\hat{x} + By + \hat{r} \quad \text{[Equation 6]}$$

In this case, assuming that block transform and quantization are used, the decoded residual $\hat{r}$ may be expressed like Equation 7.

$$\hat{r} = H\hat{c} \quad \text{[Equation 7]}$$

In this case, H indicates inverse transform, and $\hat{c}$ indicates a dequantized transform coefficient received by the decoder.

Assuming that I is an identity matrix, $\hat{x}$ may be derived like Equation 8.

$$\hat{x} = A\hat{x} + By + H\hat{c},$$

$$(I-A)\hat{x} = By + H\hat{c},$$

$$\hat{x} = (I-A)^{-1}By + (I-A)^{-1}H\hat{c} \quad \text{[Equation 8]}$$

In this case, since A is strictly lower triangular, it is guaranteed that an inverse matrix of a matrix (I–A) is present.

In an embodiment of the present invention, if the same reference block is given, the reconstructed block $\hat{x}_h$ of a common hybrid coder may be written like Equation 9.

$$\hat{x}_h = y + H\hat{c}_h \quad \text{[Equation 9]}$$

In this case, y indicates a prediction block, H indicates inverse transform, and $\hat{c}_h$ indicates a dequantized transform coefficient.

The decoder to which the present invention is applied may perform using transform of Equation 10.

$$T_{pr} = (I-A)^{-1}H \quad \text{[Equation 10]}$$

In this case, $T_{pr}$ indicates transform applied when pixel recursive transform coding is performed, which is called pixel recursive enabling transform. The $T_{pr}$ may be non-orthogonal although H is an orthogonal matrix.

As described above, from Equation 10, it may be seen that the decoder uses $T_{pr}$ and the encoder use inverse transform H. Thereafter, the decoder may perform pixel recursive decoding within a block.

Accordingly, the encoder needs to obtain an optimal quantized transform coefficient for the $T_{pr}$.

Figure 7:
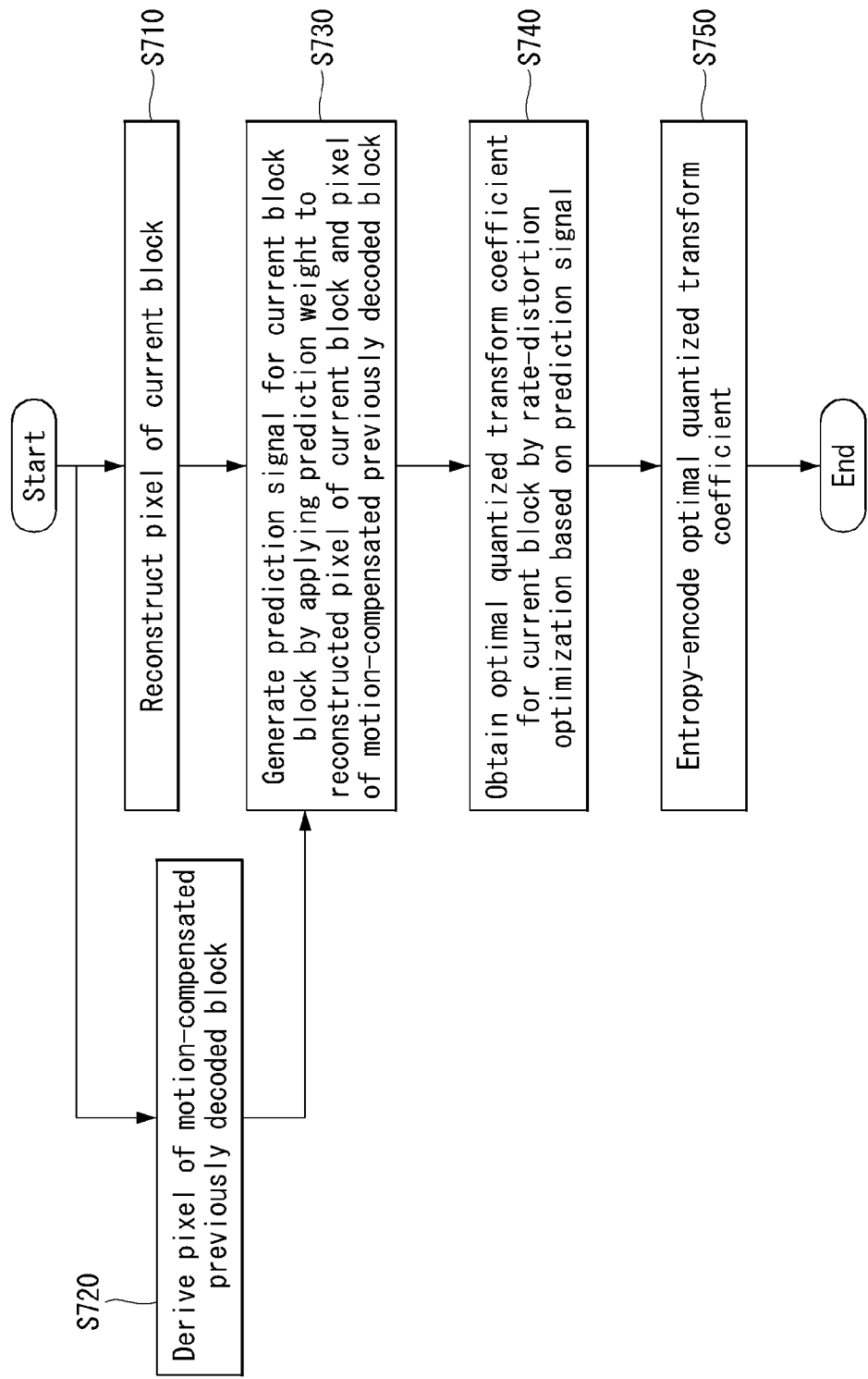
FIG. 7 shows an encoding flowchart of the algorithm of pixel recursive transform coding in which pixel recursive coding and transform coding are coupled is performed as an embodiment to which the present invention is applied.

FIG. 7 shows an encoding flowchart of the algorithm of a pixel recursive transform coding in which a pixel recursive coding and a transform coding are coupled is performed as an embodiment to which the present invention is applied.

The present invention provides a method of encoding a video signal using an enhanced prediction signal.

First, the encoder may reconstruct a pixel of a current block using previously decoded pixels within a current frame (S710).

Meanwhile, the encoder may derive a pixel of a motion-compensated previously decoded block (S720).

The encoder may generate a prediction signal for the current block by applying a prediction weight to the reconstructed pixel of the current block and the pixel of the motion-compensated previously decoded block (S730).

In this case, the prediction weight may be generated based on a predetermined block type. For example, the predetermined block type is divided into a plurality of categories. The plurality of categories may include at least one of a horizontal type, a vertical type, a diagonal type, a non-diagonal type or a smooth type.

Furthermore, the plurality of categories may be classified based on a score obtained by filtering the motion-compensated previously decoded block. For example, a 5-tap flattening filter may be used to determine a score of the smooth type, and the 3-tap directional filter may be used to determine a score of the remaining types.

The encoder may obtain an optimal quantized transform coefficient for the current block by rate-distortion optimization based on the prediction signal (S740).

The encoder may entropy-encode the optimal quantized transform coefficient (S750).

Figure 8:
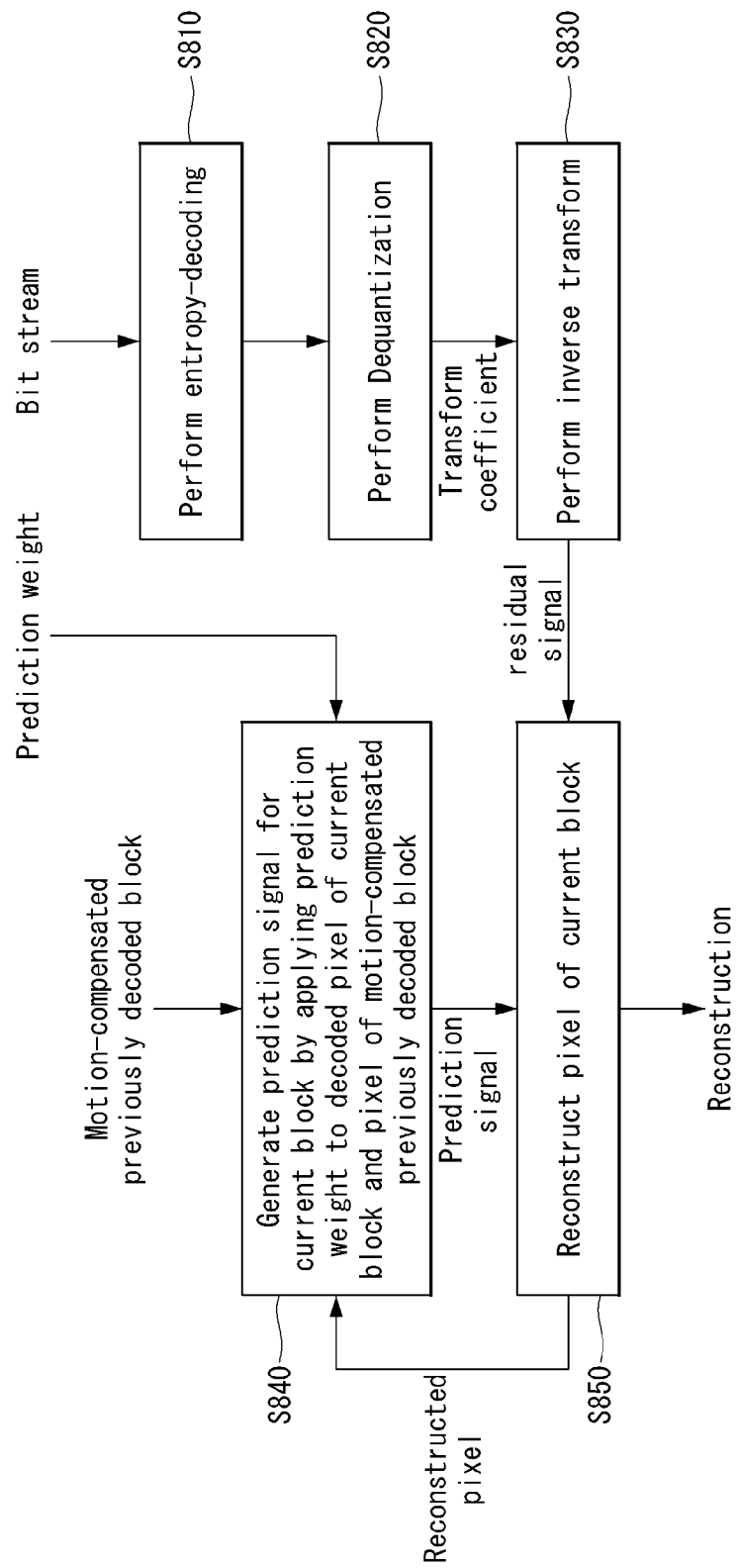
FIG. 8 shows a decoding flowchart of the algorithm of pixel recursive transform coding in which pixel recursive coding and transform coding are coupled is performed as an embodiment to which the present invention is applied.

FIG. 8 shows a decoding flowchart of the algorithm of pixel recursive transform coding in which pixel recursive coding and transform coding are coupled is performed as an embodiment to which the present invention is applied.

The present invention provides a method of decoding a video signal using an enhanced prediction signal.

First, the decoder may receive a bit stream and entropy-decode the bit stream (S810).

The decoder may obtain a transform coefficient by inverse-quantizing the entropy-decoded signal (S820).

The decoder may reconstruct a residual signal by performing inverse-transform on the transform coefficient (S830).

Meanwhile, the decoder may generate a prediction signal for the current block by applying a prediction weight to a decoded pixel of a current block and a pixel of a motion-compensated previously decoded block (S840).

In this case, the prediction weight may have been generated based on a predetermined block type. The prediction weight may have been previously stored in the encoder and the decoder. Furthermore, the decoder may derive a corresponding prediction weight based on a block type of the current block.

The aforementioned embodiments may be applied to the predetermined block type, and a redundant description of the block type is omitted.

The decoder may reconstruct a pixel of the current block by adding the reconstructed residual signal to the prediction signal (S850).

In another embodiment, the decoder may receive a pixel recursive transform flag and perform steps S840 to S850 based on the pixel recursive transform flag. In this case, the pixel recursive transform flag indicates whether an optimal quantized transform coefficient is obtained by rate-distortion optimization based on a prediction signal. In this case, the prediction signal may mean that it has been generated by the proposed pixel recursive transform coding method.

Figure 9:
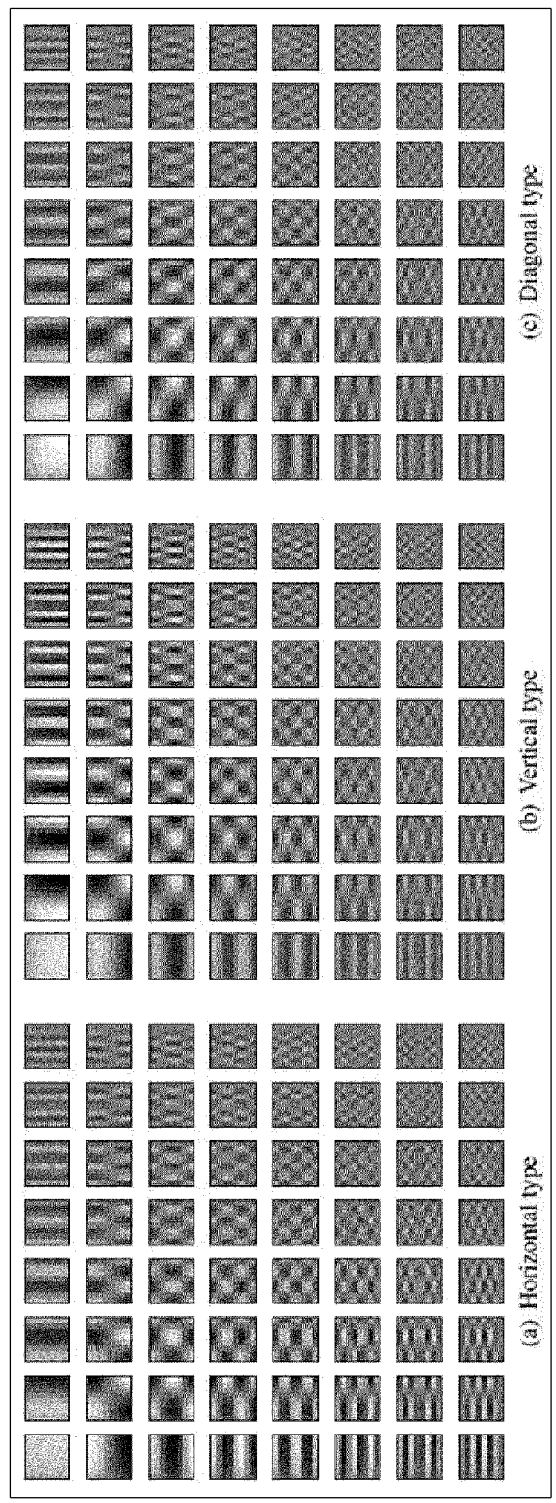
FIGS. 9 and 10 show pixel recursion transforms for illustrating block types used to determine a prediction weight as embodiments to which the present invention is applied.
Figure 10:
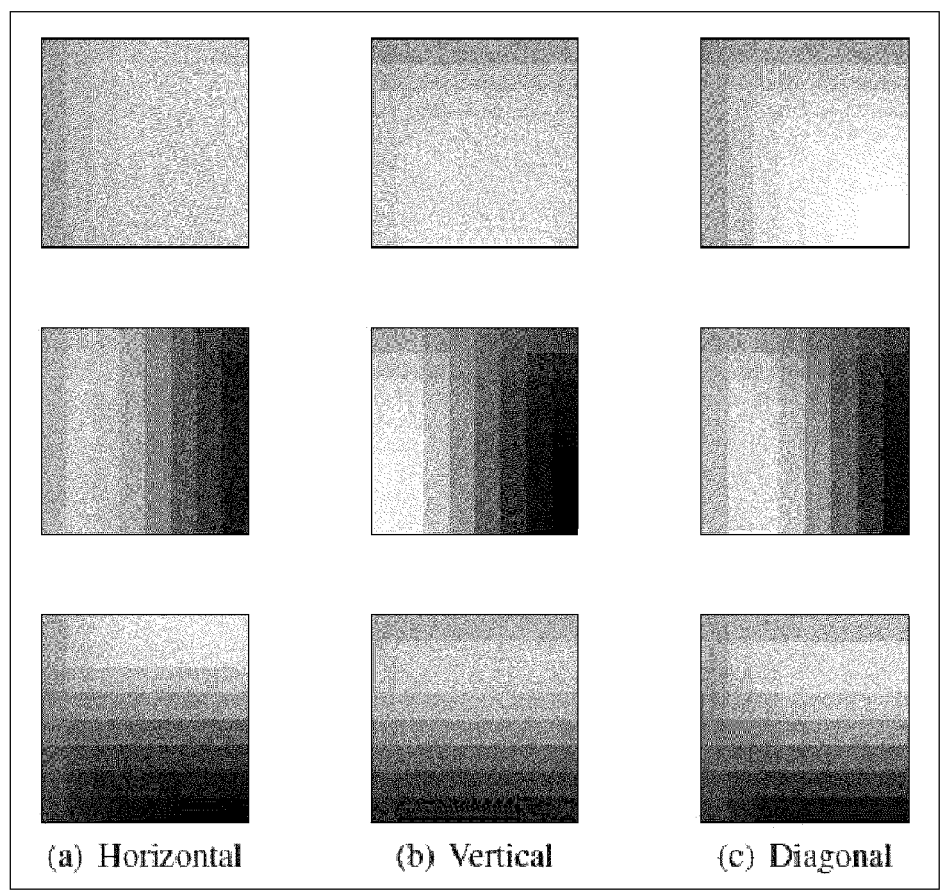

FIGS. 9 and 10 show pixel recursion transforms for illustrating block types used to determine a prediction weight as embodiments to which the present invention is applied.

Determination of Prediction Weight (or Prediction Matrix)

As described in the above embodiment, according to an embodiment of the present invention, a prediction weight may be generated based on a predetermined block type.

For example, the predetermined block type is divided into a plurality of categories. The plurality of categories may include at least one of a horizontal type, a vertical type, a diagonal type, a non-diagonal type or a smooth type.

Referring to FIG. 9, FIGS. 9(a) to 9(c) show $T_{pr}$ bases (column vectors of a $T_{pr}$ matrix) for an 8×8 blocks classified into the horizontal type, vertical type and diagonal types, respectively, which play a role as reconstruction bases.

From FIG. 9(a), it may be seen that a first column shows a stronger response than a first row. From FIG. 9(b), it may be seen that a first row shows a stronger response than a first column. From FIG. 9(c), it may be seen that energy between rows and columns are uniformly distributed.

FIG. 10 shows that three of bases forming $T_{pr}$ with respect to the three block types of FIG. 9 are selected. The three bases correspond to three blocks at the left top in FIGS. 9(a) to 9(c).

A phenomenon, such as that of FIG. 9, may also be seen in FIG. 10. For example, it may be seen that energy is propagated from the left to the right in the case of the horizontal type of FIG. 10(a), from top to bottom in the case of the vertical type of FIG. 10(b), and in a diagonal direction in the case of the diagonal type of FIG. 10(c).

Meanwhile, the prediction weight may be expressed as a prediction matrix. For example, the prediction matrix may be A, B of Equation 8. Furthermore, since a block may have various image features, various prediction matrices may be used in order to consider the structural differences of blocks.

A motion-compensated block y may have a structure very similar to a block x because it indicates optimal prediction calculated from previous frames. Accordingly, the decoder may efficiently code the block x based on y. For example, the decoder can remove signaling for a block type by identically calculating the type of block based on y as in the encoder.

The present invention proposes an algorithm for efficiently classifying block types into a plurality of categories. The classification algorithm may be based on energy responses of different filter applied to y.

For example, it is assumed that $F_i$ (i=0, ..., k−1) is k filter operator sets. In this case, each filter may correspond to one block type. The filter response is expressed as a matrix like Equation 11.

$$f_i = F_i y \quad \text{[Equation 11]}$$

Furthermore, the block type may be determined by solving Equation 12.

$$b = \operatorname*{argmin}_i \|f_i\|_2^2 \quad \text{[Equation 12]}$$

In one embodiment, the block type may be divided into a plurality of categories. For example, the block type may include at least one of a horizontal type, a vertical type, a diagonal type, a non-diagonal type or a smooth type.

For another example, for simplification and speed, a 3-tap directional filter may be applied to the first 4 block types, and a 5-tap flattening filter may be applied to the smooth type. However, the present invention is not limited thereto, and may include other combinations.

It may be seen how well a current sample can be predicted from neighbor samples through such a filter combination.

Meanwhile, in Equation 8, the prediction matrices A and B may be substituted with $A_b$ and $B_b$.

The matrices $A_i$ and $B_i$ may be determined using other methods in addition to the embodiment. For example, HEVC intra prediction matrices may be used. Alternatively, $A_i$ and $B_i$ may be determined by calculating optimal prediction weight values by solving an optimization problem for a target function value that simulates rate-distortion score calculation.

In one embodiment, the matrix $B_i$ may be set like Equation 13.

$$B_i = (I - A_i) \quad \text{[Equation 13]}$$

In another embodiment, $\Gamma_{m,n}$ in Equation 3 may be limited to include only four pixels of 8 neighbor pixels not all of the 8 neighbor pixels so that a prediction filter having a smaller number of taps (e.g., 4-tap).

Figure 11:
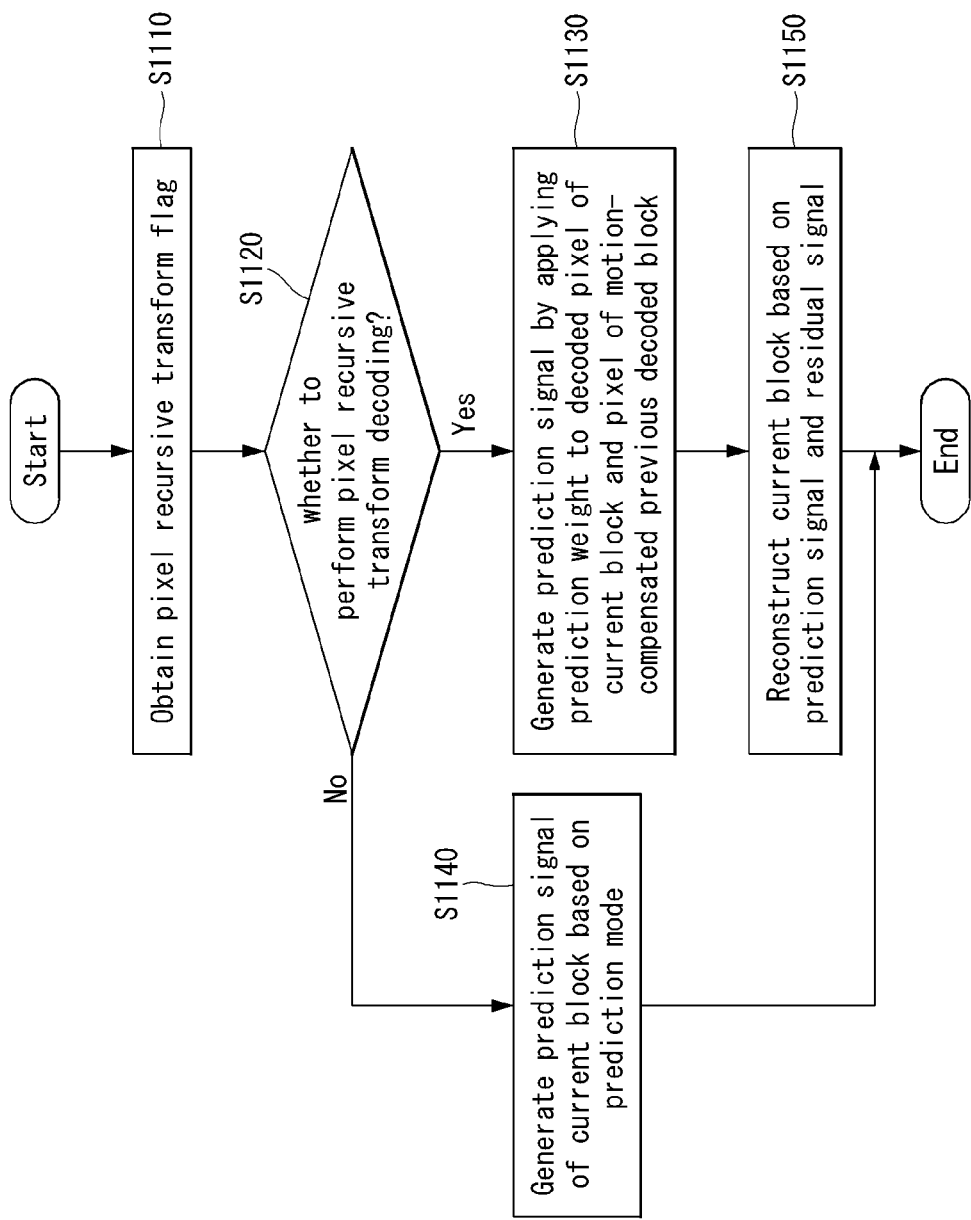
FIG. 11 is a flowchart illustrating a process of reconstructing a video signal based on a pixel recursive transform flag as an embodiment to which the present invention is applied.

FIG. 11 is a flowchart illustrating a process of reconstructing a video signal based on a pixel recursive transform flag as an embodiment to which the present invention is applied.

The present invention provides a method of defining a pixel recursive transform flag indicating whether a pixel recursive transform decoding is performed.

The pixel recursive transform flag indicates whether an optimal quantized transform coefficient is obtained by rate-distortion optimization based on a prediction signal. In this case, the prediction signal may mean that it has been generated by the proposed pixel recursive transform coding method.

First, the decoder may parse (or obtain) a pixel recursive transform flag from a bit stream (S1110).

The decoder may determine whether pixel recursive transform decoding is performed based on the pixel recursive transform flag (S1120).

If the pixel recursive transform decoding is performed based on the pixel recursive transform flag, the decoder may generate a prediction signal by applying a prediction weight to a decoded pixel of a current block and a pixel of a motion-compensated previous decoded block (S1130).

In contrast, if the pixel recursive transform decoding is not performed based on the pixel recursive transform flag, the decoder may generate a prediction signal of the current block based on a prediction mode (S1140).

The decoder may reconstruct the current block based on the prediction signal and a residual signal (S1150).

In another embodiment of the present invention, pixel recursive transform coding algorithm may be integrated with HEVC reference software. The present method may be used as an inter-prediction tool because parameters are decoded from previous frames and selected so that motion-compensated blocks are used. However, the present invention is not limited thereto, and may be extended to a hybrid inter/intra-prediction tool.

According to an embodiment of the present invention, in the encoder, each TU performs a rate-distortion optimization process twice. For example, a rate-distortion optimization process for a current partition may be performed, and a rate-distortion optimization process may be performed to find out an optimal quantized transform coefficient that satisfies Equation 8.

Figure 12:
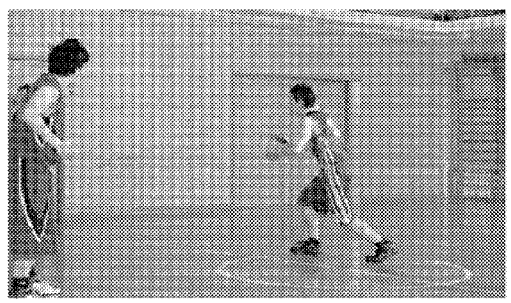
FIGS. 12 to 14 are diagrams for illustrating cases where pixel recursive transform coding is used in a decoded frame as embodiments to which the present invention is applied.
Figure 12:
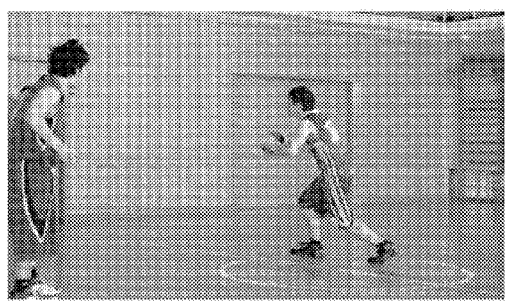
Figure 12:
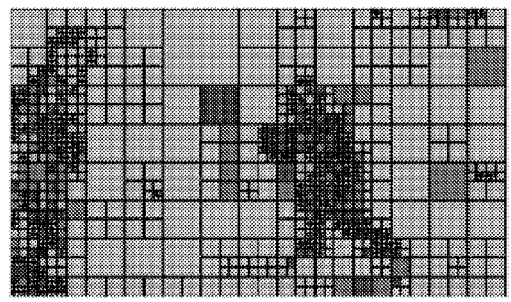
Figure 13:
Figure 13:
Figure 13:
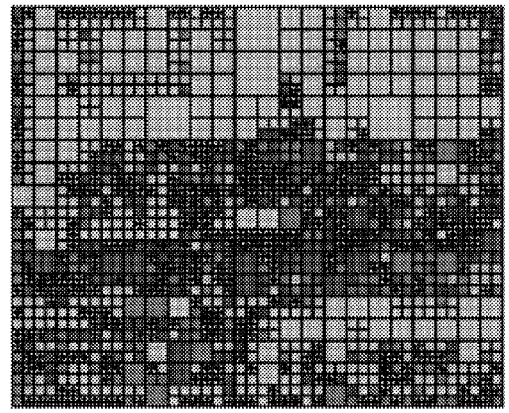
Figure 14:
Figure 14:
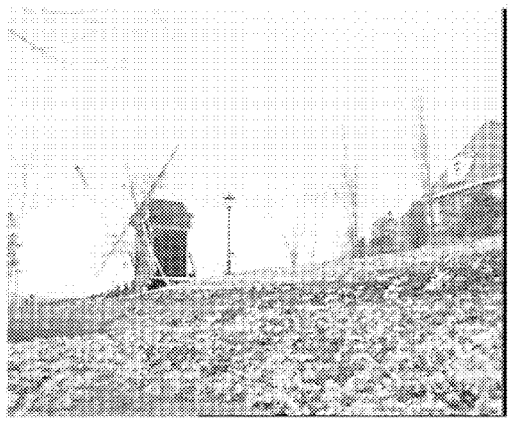
Figure 14:
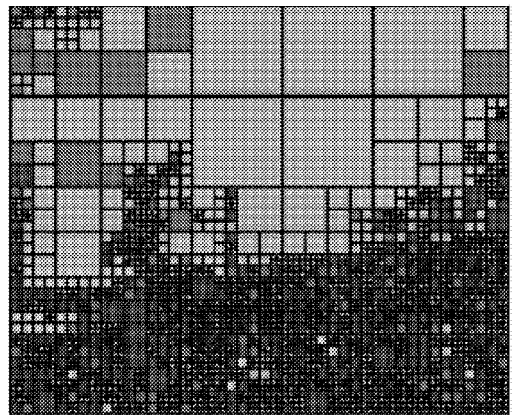

FIGS. 12 to 14 are diagrams for illustrating cases where pixel recursive transform coding is used in a decoded frame as embodiments to which the present invention is applied.

FIGS. 12 to 14 show the utilization of the pixel recursive transform coding method with respect to the transform unit of a reference frame, decoded frame and quadtree structure in three image (BasketballPass, Bus and Flower) types.

FIGS. 12(c), 13(c), and 14(c) show a region in which the pixel recursive transform coding method (or pixel recursive transform coding mode) is on or off and a region not having a residual. It may be seen that the pixel recursive transform coding method is on in most of coded TU.

FIG. 15 is a table showing high efficiency video coding (HEVC) versus a percentage of Bjontegaard Delta (BD)-rate savings for 9 test sequences as an embodiment to which the present invention is applied.

In the embodiment of the present invention, tests were performed on the 9 sequences. All of the sequences are 300 frames except Bus (150 frames) and Flower (250 frames). The first 6 sequences have CIF resolution (352×288 pixels), and the remaining three sequences are 416×240.

Referring to FIG. 15, an average percentage of bitrate savings for a PSNR that is identically achieved using a Bjontegaard Delta (BD)-rat with respect to the 9 sequences is calculated.

From FIG. 15, it may be seen that the results have been improved in all of the 9 sequences.

As described above, the embodiments explained in the present invention may be implemented and performed in a processor, a micro-processor, a controller or a chip. For example, the functional modules explained in FIGS. 1, 2, 5 and 6 may be implemented and performed on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus, and may be used to code video signals and data signals.

Furthermore, the decoding/encoding method to which the present invention is applied may be produced in the form of a program to be executed by a computer, and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a blue ray disk (BD), a USB, ROM, RAM, CD-ROM, a magnetic tape, a floppy disk, and an optical data storage device, for example. Furthermore, the computer-readable recording median includes media implemented in the form of carrier waves (e.g., transmission through the Internet). Furthermore, a bit stream generated by the encoding method may be stored in a computer-readable recording medium or may be transmitted over a wired/wireless communication network.

INDUSTRIAL APPLICABILITY

The exemplary embodiments of the present invention have been disclosed for illustrative purposes, and those skilled in the art may improve, change, replace or add various other embodiments within the technical spirit and scope of the present invention disclosed in the attached claims.

The invention claimed is:

1. A method for encoding a video signal by an apparatus for encoding the video signal using an enhanced prediction signal, comprising:

generating a prediction signal for a current block, wherein the prediction signal is generated by applying a prediction weight to a reconstructed pixel of the current block and a pixel of a motion-compensated previously decoded block;

obtaining an optimal quantized transform coefficient for the current block by a rate-distortion optimization based on the prediction signal; and entropy-encoding the optimal quantized transform coefficient, wherein the prediction weight is generated based on a predetermined block type.

2. The method of claim 1, wherein:

the predetermined block type is divided into a plurality of categories, and the plurality of categories comprises at least one of a horizontal type, a vertical type, a diagonal type, a non-diagonal type or a smooth type.

3. The method of claim 2, wherein the plurality of categories is classified based on a score obtained by filtering the motion-compensated previously decoded block.

4. The method of claim 3, wherein:

a 5-tap flattening filter is used to determine a score of the smooth type, and a 3-tap directional filter is used to determine a score of remaining types.

5. The method of claim 1, further comprising transmitting a pixel recursive transform flag indicating whether the optimal quantized transform coefficient is obtained by the rate-distortion optimization based on the prediction signal.

6. A method for decoding a video signal by an apparatus for decoding the video signal using an enhanced prediction signal, comprising:

entropy-decoding the video signal;

inverse-quantizing the entropy-decoded video signal to obtain a transform coefficient;

reconstructing a residual signal by performing an inverse-transform on the transform coefficient;

generating a prediction signal for a current block of the video signal; and reconstructing the video signal by adding the reconstructed residual signal to the prediction signal, wherein the prediction signal is generated by applying a prediction weight to a reconstructed pixel of the current block and a pixel of a motion-compensated previously decoded block, and wherein the prediction weight is generated based on a predetermined block type.

7. The method of claim 6, wherein:

the predetermined block type is divided into a plurality of categories, and the plurality of categories comprises at least one of a horizontal type, a vertical type, a diagonal type, a non-diagonal type or a smooth type.

8. The method of claim 7, wherein the plurality of categories is classified based on a score obtained by filtering the motion-compensated previously decoded block.

9. The method of claim 8, wherein:

a 5-tap flattening filter is used to determine a score of the smooth type, and a 3-tap directional filter is used to determine a score of remaining types.

10. The method of claim 6, further comprising transmitting a pixel recursive transform flag indicating whether the optimal quantized transform coefficient is obtained by the rate-distortion optimization based on the prediction signal.

11. An apparatus for encoding a video signal using an enhanced prediction signal, comprising:

a prediction unit to generate a prediction signal for a current block;

a transform unit to obtain an optimal quantized transform coefficient for the current block by a rate-distortion optimization based on the prediction signal; and an entropy encoding unit to entropy-encode the optimal quantized transform coefficient, wherein the prediction signal is generated by applying a prediction weight to a reconstructed pixel of the current block and a pixel of a motion-compensated previously decoded block, and wherein the prediction weight is generated based on a predetermined block type.

12. The apparatus of claim 11, wherein the transform unit transmits a pixel recursive transform flag indicating whether the optimal quantized transform coefficient is obtained by the rate-distortion optimization based on the prediction signal.

13. An apparatus for decoding a video signal using an enhanced prediction signal, comprising:

an entropy decoding unit to entropy-decode the video signal;

a dequantization unit to obtain a transform coefficient by inverse-quantizing the entropy-decoded video signal;

a transform unit to reconstruct a residual signal by performing an inverse transform on the transform coefficient;

a prediction unit to generate a prediction signal for a current block of the video signal; and a reconstruction unit to reconstruct the video signal by adding the reconstructed residual signal to the prediction signal, wherein the prediction signal is generated by applying a prediction weight to a reconstructed pixel of the current block and a pixel of a motion-compensated previously decoded block, and wherein the prediction weight is generated based on a predetermined block type.

* * * * *